L. LEMAITRE.
BOLT FOR SPRING RINGS AND PROCESS OF MANUFACTURING THE SAME.
APPLICATION FILED MAR. 24, 1921.

1,423,441. Patented July 18, 1922.

INVENTOR
LUCIEN LEMAITRE
BY Munn & Co.
ATTORNEYS

UNITED STATES PATENT OFFICE.

LUCIEN LEMAITRE, OF PARIS, FRANCE.

BOLT FOR SPRING RINGS AND PROCESS OF MANUFACTURING THE SAME.

1,423,441.  Specification of Letters Patent.  Patented July 18, 1922.

Application filed March 24, 1921. Serial No. 455,304.

*To all whom it may concern:*

Be it known that I, LUCIEN LEMAITRE, a citizen of the Republic of France, of 20 Boulevard des Filles-du-Calvaire, Paris, France, chain manufacturer, have invented an Improved Bolt for Spring Rings and Processes of Manufacturing the Same (for which I have filed applications in France December 6, 1913, No. 474,521; Switzerland December 20, 1919, No. 89,593; Italy December 31, 1919, No. 88, vol. 518; Belgium December 20, 1919, No. 283,984; Great Britain December 6, 1913, No. 137,319), of which the following is a full, clear, and exact description.

This invention has for its object a new method of making the bolts of spring rings employed more especially in jewelry.

It is known that these spring rings are formed by a suitably curved hollow metal tube, between the two ends of which there is left a free space sufficient to permit of the ring being engaged in any object, for example in the button-hole of a coat or waistcoat.

This free space between the two ends of the ring is closed by a bolt that slides in the ring and is acted upon by a spring which always tends to keep it in the closed position. The bolt can be drawn back by means of a button which projects externally, in order to enable the opening in the ring to be freed.

At present, in order to make the bolts of spring rings, recourse is had to several different processes.

The first of these processes consists in cutting the bolt and its button out of a sheet of thick metal; the piece thus obtained is then stamped in order to round it, by flattening down its angles.

The second process consists in forming the bolt from metal wire of round cross-section and of a diameter such that it may be fitted easily into the hollow body of the ring. This wire is suitably curved, then cut to the desired length; it afterwards has a screw-threaded hole formed right through it in order to receive a button, the screw-threaded tail, or stem, of which is screwed into the said hole. This button and its tail or stem are produced by turning from a metal wire of suitable section.

Finally, a third known process consists in also forming the bolt from a wire of round cross-section cut at its ends and bent at a point in its length to form a button.

The first process of manufacture occasions a considerable loss of metal resulting from the cutting up of the strip metal from which the bolts are made.

The second process presents the inconvenience that by reason of the small dimensions of the button, the manufacture of the latter is very difficult and its assembling requires much skill on the part of the workman. Moreover, it frequently happens that the button becomes detached from the bolt, so that it is impossible to manipulate the latter.

These two processes moreover present the disadvantage of allowing the internal metal or core to appear at the cut or reduced surfaces when the ring and its bolt are made of plated metal.

This last disadvantage is evidently also inherent in the third process mentioned above, which presents moreover the following serious disadvantages:

1. As the button of the bolt made according to this process is formed by the coupling together of two round wires, it results that there is always between the wires a hollow or concavity which it is impossible to fill up even by heavy compression. The button has thus an ungraceful appearance so that the process can only be employed in the manufacture of very common low-priced rings.

2. In order to reduce as much as possible the said concavity of the button, one has been led to reduce the diameter of the wire, but the bolt then has lost motion in the ring and there is thus a risk of its abutting against the edge of the ring or even of passing outside the latter. In order to reduce this lost motion, one is obliged to ensure the accurate guidance of the bolt by giving it a great length, but this great length necessitates a special construction of the ring. In fact, the joint of this ring has to be on the top in order that one may be able partly to open the end of the ring in order to introduce the bolt. This necessity of placing the joint on the external periphery of the ring deteriorates the appearance of the ring and militates against the application of this bolt to rings of value.

Moreover, this bolt cannot be employed on rings as now made with the joint on the inside.

3. The wire of the bolt is cut off straight at each end, which increases the risk indicated above of the end of the bolt, if this latter is not perfectly guided, abutting against the edge of the ring.

4. The wire of round section cannot be employed for the formation of bolts of rectangular or square section adapted to be applied to rings of corresponding section.

In fact, if a round wire be taken for producing the button, it is scarcely possible to bring this wire to a rectangular or square cross-section corresponding to that of the ring, or if one succeeds, the section will be too weak or it will be necessary to give exaggerated dimensions to the button.

If, on the contrary, a wire be taken of rectangular or square cross-section corresponding to that of the ring, it will not be possible to obtain by stamping a round button of reduced dimensions.

The process of manufacture which forms the object of the present invention obviates all the disadvantages which have just been mentioned.

This process consists, essentially, in forming the bolt of metal wire of semi-cylindrical cross-section or of flattened half-round form, bent back on itself at its ends in such a manner as to give to the whole a cylindrical form, the button being also produced by folding back a convenient portion of the metal wire and subjecting it to the action of a suitable machine.

The invention is shown by way of example in the accompanying drawing wherein:—

Figure 1:
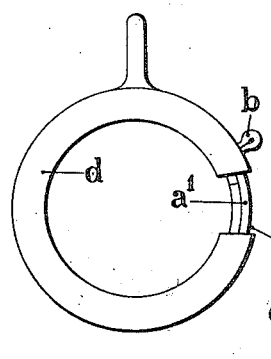
Figure 1 shows in elevation a spring ring provided with the improved bolt forming the object of the present invention.

As shown in the drawing, the bolt of the spring ring forming the object of the present invention is constituted by a metal wire $a$ which is suitably bent and also forms the button or organ $b$ whereby the bolt may be grasped.

Figure 5:
Fig. 5 is an end view thereof.

The wire $a$ is of half round, that is to say, semi-cylindrical form, as shown in Fig. 5, or of a slightly flattened form.

Figure 4:
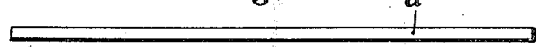
Fig. 4 shows separately the portion of the metal wire that is to form the bolt.
Figure 6:
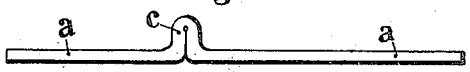
Figs. 6 to 10 show the different phases in the manufacture of the bolt.

In order to form the bolt, a portion of this wire is cut of suitable length (Fig. 4), then by the aid of a suitable machine a part of this wire designed to form the button $b$ is bent by applying the flat surfaces of this wire one against the other, as shown in Fig. 6. There is thus obtained a kind of finger $c$ arranged perpendicularly to the wire $a$.

Figure 7:
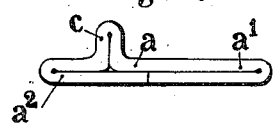

This done, the parts of the wire on both sides of the roughly shaped button $b$ are bent so as to bring one against the other the flat surfaces of this wire, and in such a manner that the two ends of the latter come into contact, as shown in Fig. 7.

The bent parts of the wire are not of the same length; the longer part is designed to form the bolt proper $a^1$ and the shorter part to form a tongue $a^2$ against which the spring takes a bearing, as will be seen further on. On the other hand, the bent back parts of the wire have a length such that their point of junction is not below the button $b$ in order not to weaken the bolt at this point.

Figure 8:

When the wire is thus bent, it is double at all parts, which have throughout a round cross-section as shown in Fig. 8, since the two flat surfaces of the said wire are applied one against the other and the wire is of semi-cylindrical cross-section.

Figure 9:
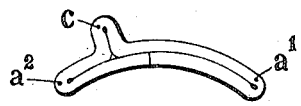

The roughly shaped bolt arranged as just described is then curved according to the degree of curvature of the ring in which it is to be placed (Fig. 9), then the button $b$ is formed by exerting pressure on the finger $c$ by means of a spinning machine.

Figure 10:
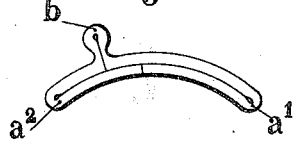

The bolt is then completed and is ready to be placed in the ring (Fig. 10).

Figure 2:
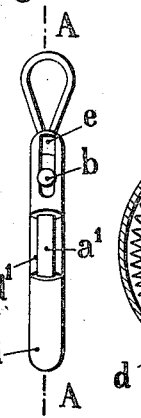
Fig. 2 is a front view thereof.
Figure 3:
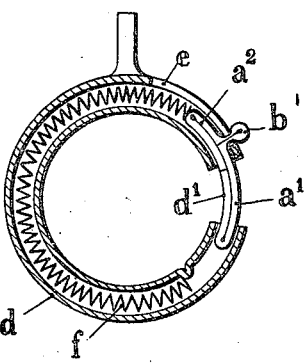
Fig. 3 is a vertical section on the line A—A, Fig. 2.

Figs. 1 to 3 of the drawing show the improved bolt in use. The body of the bolt is fitted into the tubular ring $d$ which is open at $d^1$. The button $b$ projects at the exterior of the ring and can move in a slot $e$ of suitable length. The bolt always tends to be maintained by a coil spring $f$ in the position in which it closes the opening $d^1$. This spring is arranged in the interior of the ring $d$ and abuts against the tongue $a^2$.

The bolt described and its process of manufacture present the following principal advantages:—

1. All the operations of the manufacture take place mechanically and with very great regularity, which considerably reduces the cost.

2. All waste of material is avoided.

3. The button of the bolt has a diameter equal to that of the rod or stem of the bolt; its section is preferably circular and its joint is completely hidden, which enables this bolt to be made of precious metals and to be applied to objects of value.

4. The bolt may have a diameter very slightly less than the diameter of the ring. It thus does not require to be guided over a great length and as its length can be reduced, it can be introduced into the ring through the guide-slot. It follows that it can be mounted on all rings as at present manufactured and on valuable rings with an internal joint.

5. By reason of the perfect way in which it is guided, the bolt cannot abut against the edge of the ring, but even in the case where this occurs the rounded form of the ends of the bolt ensures its keeping central, so that it is always brought back into its socket in the ring.

6. The half round wire of the bolt can be easily brought by compression to a rectangular or square form, so that this bolt can be applied to rings of corresponding section.

7. In the case where the bolt is made by means of plated wire, the interior or base metal is hidden at both ends.

Claims:

1. A bolt for a spring ring for jewelry, characterized in that the body of the bolt and the operating button are formed by a common metal wire of semi-cylindrical section or of flattened half-round form, this wire being bent at a point in its length in order to form the button, and at each of its ends, its flat surfaces being applied one against the other, in such a manner that the finished bolt has a cylindrical form with rounded ends and its button, after compression, has a perfectly circular section with its joint completely hidden.

2. The process of manufacture of the bolt claimed in claim 1, this process consisting in cutting to the desired length a portion of wire, in bending a part of this wire at a predetermined point in its length, in applying the flat surfaces of the latter one against the other in such a manner as to constitute a cylindrical finger perpendicular to the remainder of the wire constituting the rough shape of the button, in bending the parts on both sides of this finger by applying one against the other the flat surfaces of the said wire and in such a manner that the ends of the latter come into contact, in curving according to the desired curve the roughly shaped bolt thus obtained and in forming the button by putting the finger constituting the rough shaping of the said button into a machine for spinning it to the desired form, substantially as described.

The foregoing specification of my "Improved bolt for spring rings and the process of manufacturing the same", signed by me this 10th day of March, 1921.

LUCIEN LEMAITRE.

Witnesses:
 ROBERT YOUINEAU,
 MATHEIN GUIRAND.